INVENTOR.
HAROLD A. O'HERN JR
BY KERMIT E. OLSON
ATTORNEYS

United States Patent Office 3,752,875
Patented Aug. 14, 1973

3,752,875
PROCESS FOR INCREASING REACTION RATE IN CONVERSION OF SULFIDES AND HYDROSULFIDES
Harold A. O'Hern, Jr., Toledo, Ohio, and Kermit E. Olson, Tomahawk, Wis., assignors to Owens-Illinois, Inc.
Filed Dec. 28, 1970, Ser. No. 101,524
Int. Cl. C01b 17/64
U.S. Cl. 423—201         17 Claims

ABSTRACT OF THE DISCLOSURE

A catalytic process for enhancing the rate of oxidation of alkaline solutions of water-soluble, oxidizable, inorganic sulfides and/or hydrosulfides wherein effective catalytic amounts of water-insoluble smelt solids are employed. These solids selectively catalyze the reaction by which thiosulfate is formed. This catalytic process may also be employed for substantially increasing the rate of oxidation of sulfides in a pulping green liquor to thereby greatly deplete the amount of sodium sulfide present therein and simultaneously form substantial quantities of sodium hydroxide which may be employed to absorb effluent sulfur dioxide emanating, for example, from boilers.

THE INVENTION

Figure 1:
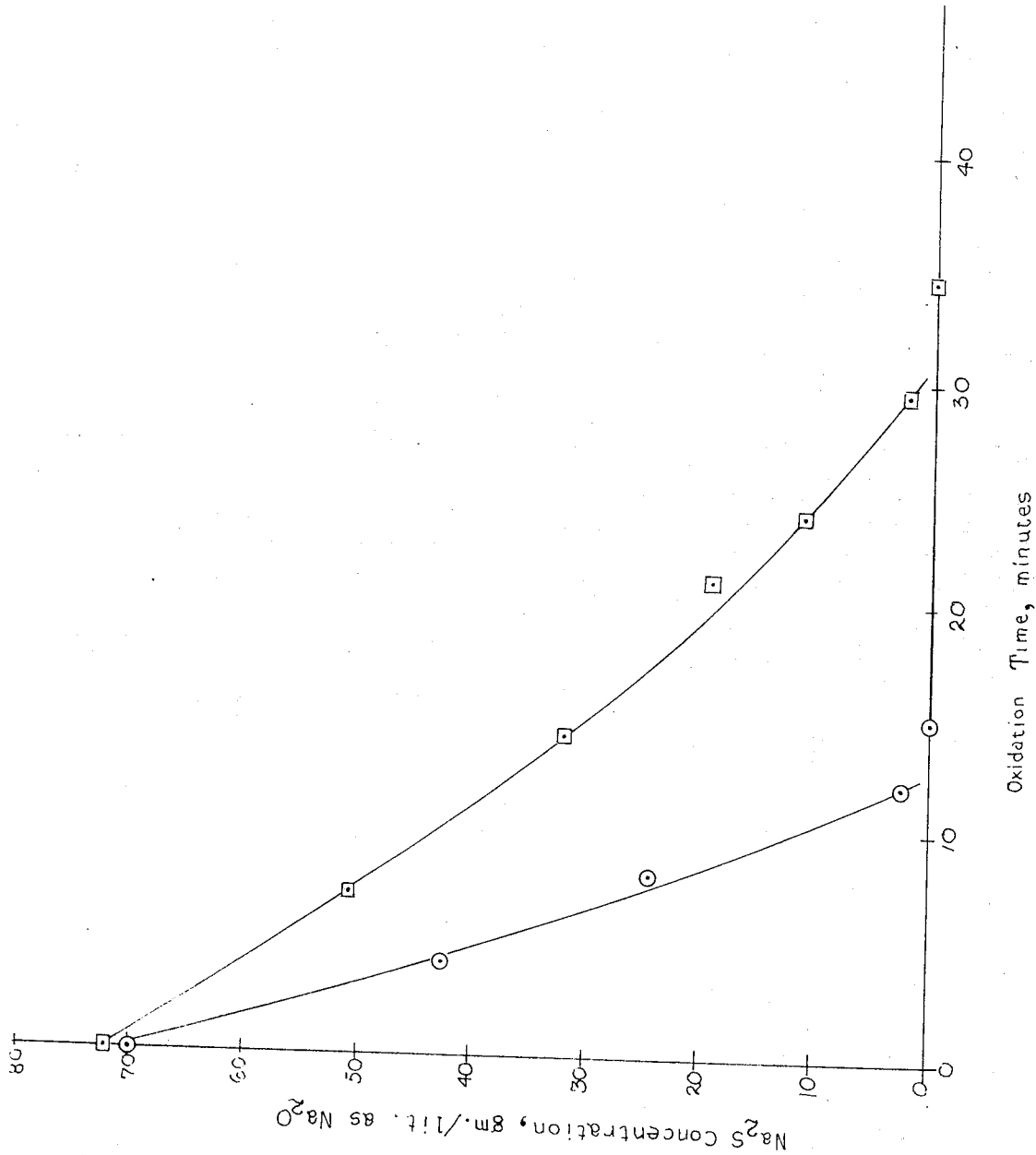

The present invention relates to a novel catalytic process and, more specifically, to a novel catalytic process for effecting direct and rapid oxidation of sulfides and/or hydrosulfides such as, for example, the water-soluble alkali sulfides and hydrosulfides.

According to one aspect of this invention, there is provided a direct oxidation process employing water-insoluble solids which naturally occur in smelt as formed in the pulping industry for greatly increasing the rate of oxidation of inorganic sulfides and/or inorganic hydrosulfides in an alkaline, aqueous solution.

According to another aspect of this invention, there is added to an alkaline solution of water-soluble, oxidizable, inorganic sulfides and/or hydrosulfides an effective catalytic amount of insoluble smelt solids for purposes of greatly increasing the rate by which a major proportion of the sulfide and/or hydrosulfide will undergo oxidation.

According to yet another aspect of this invention, there is added in addition to the insoluble smelt solids effective catalytic amounts of water-soluble salts of, for example, nickel and cobalt, for purposes of further increasing the oxidation rate of alkaline solutions of oxidizable inorganic sulfides and hydrosulfides and for especially increasing the rate at lower concentrations of the sulfide and hydrosulfide.

According to yet another aspect of this invention, insoluble smelt solids are effectively employed to greatly increase the oxidation rate of green liquor solutions to produce substantial quantities of caustic and to substantially deplete the sulfide concentration in the green liquor, whereby the product of the oxidation reaction may be then effectively employed to absorb undesirable effluent gases, such as, for example, hydrogen sulfide and sulfur dioxide.

DESCRIPTION

The general chemical reactions involved in the present catalytic process may be thought of as proceding along the lines represented by the equations set forth below:

(1)     $2Na_2S + 2O_2 + H_2O \rightarrow NaS_2O_3 + 2NaOH$ (2)     $2Na_2S + 3O_2 \rightarrow 2Na_2SO_3$ (3)     $Na_2S + 2O_2 \rightarrow Na_2SO_4$ with Equation 1 apparently being the dominant reaction when done in the presence of dregs, or water-insoluble smelt solids, inasmuch as these solids seem to be a selective catalyst for that reaction. For convenience hereinafter, the product of Equation 1 will be represented as the thiosulfate but, of course, it will be apparent that caustic will also be present in the amount generally defined by this equation.

The conventional smelt obtained, after feeding black or spent liquor to the recovery furnace of a kraft or sulfite pulping mill, consists mainly of sodium carbonate and sodium sulfide but it also contains a small fraction of a solid material which is insoluble in water. Generally, this insoluble portion represents about one-half to about three weight percent and, more typically, the insoluble portion represents about 1.5 percent (1.3–1.7) by weight of the total smelt material. Ordinarily, the smelt from the furnace (including the water-insoluble solids) is used to form a smelt solution (green liquor) and the insoluble solids therein are discarded as dregs after settling or filtration. In the present process, these insoluble smelt solids, or dregs, are effectively and quite unexpectedly employed as a selective catalyst for purposes of oxidizing aqueous alkaline solutions of water-soluble inorganic sulfides (and hydrosulfides) to convert a major proportion (at least 50% by weight, more typically at least 70%, and most desirably at least 90% by weight) of the sulfide (or hydrosulfide) to thiosulfate. Additionally, water-soluble salts of nickel, cobalt and iron, such as the water-soluble nitrates, sulfates, chlorides, phosphates and the like, may be added, along with the insoluble smelt solids.

According to one aspect of this invention, an aqueous alkaline solution of water-soluble, oxidizable, inorganic sulfide or hydrosulfide is prepared. To this solution, which preferably has a pH of at least 8, and more desirably at least about 9, there is then added an effective catalytic amount of the insoluble smelt solids after which oxygen, air or other like oxygen-containing gas, is added into the solution. The oxygen-containing gas is added while the solution is at an elevated temperature in a suitable reactor and while the solution (including insoluble smelt solids) is being agitated with a conventional gas-dispersing agitator. Generally, these insoluble smelt solids have particle sizes ranging between 0.1 micron to 20 or 30 microns or even higher. The oxidation reaction is also effected at atmospheric pressure or superatmospheric pressure conditions. Exemplary of the pressures and temperatures which may be employed are operating pressures of about 14.7 p.s.i.a. to 166 p.s.i.a. and operating temperatures ranging between about 140° F. to as high as 360° F. Preferred inorganic sulfides and/or hydrosulfides which are oxidized in accordance with this invention are the water-soluble sulfides and/or hydrosulfides of sodium, potassium, lithium, calcium, magnesium, barium, strontium, cesium, and the like. Generally, the reaction is allowed to proceed for a time sufficient to deplete substantially all of the sulfide or hydrosulfide specie. That is, while the reaction may be allowed to proceed for a sufficient time to convert a major proportion of the sulfide or hydrosulfide specie to the thiosulfate specie, it is generally preferred that the reaction be allowed to proceed for a sufficient time to convert at least about 70% of the sulfide or hydrosulfide specie to the thiosulfate specie, and, most desirably, the reaction proceeds for a time sufficient such that the conversion will be at least about 90% and as high as 98% or even more.

As hereinbefore indicated, if desired, water-soluble salts of nickel, cobalt and iron may also be employed, along with the insoluble smelt solids, as a catalyst. When these materials are used, it is generally sufficient to add them into the alkaline sulfide or hydrosulfide solution in an amount of about 1 part per million to 100 parts per million of the solution which is to be oxidized.

The amount of insoluble smelt solids which are effectively employed for purposes of catalyzing the reaction will advantageously be at least about 0.1 weight percent (insoluble smelt solids) based on the total weight of the solution, including smelt solids, to be oxidized in accordance with this invention. If desired, the amount of insoluble smelt solids may be as high as 30 percent by weight, which is not uneconomical, in view of the fact that the insoluble smelt solids are readily available in the pulping industry and are extremely cheap. Preferably, the insoluble smelt solids are present in an amount of at least about .15 percent and, most desirable, at least about 0.2%.

According to a more particular aspect of this invention, the insoluble smelt solids are employed, as generally indicated above, for purposes of greatly increasing the rate by which an alkaline, sodium sulfide or sodium hydrosulfide aqueous solution is oxidized. In a still more particular aspect of this invention, the insoluble smelt solids are employed to facilitate the oxidation of a green liquor solution in order to selectively and greatly increase the reaction rate of the sulfide specie conversion to thiosulfate and sodium hydroxide.

In passing, it should be mentioned that in the examples and claims which follow, it is convenient, because of the known equilibrium which exists between the sulfide ion and the hydrosulfide ion, when using sodium sulfide and/or sodium hydrosulfide alkaline solutions (such as, for example, a green liquor solution, to refer to one of these as including the other; accordingly, the presence of the hydrosulfide will be considered as being present as additional sulfide and the total amount of sodium sulfide plus sodium hydrosulfide will, therefore, be represented as sodium sulfide. Additionally, for purposes of convenience, the amount of sodium sulfide (including hydrosulfide) will be reported on a sodium oxide basis.

With regard to the aspect of this invention involving the oxidation of green liquor, two approaches in general may be followed. First of all, the conventional clarified green liquor may be oxidized by adding thereto the appropriate effective catalytic amounts of the insoluble smelt solids as indicated above or, secondly, the unclarified green liquor may be employed since it generally will have the effective catalytic amount of the insoluble smelt solids already present therein. Of course, it will be readily apparent that the unclarified green liquor may be allowed to settle for a time sufficient to obtain a desirable insoluble smelt solids concentration, for example, 0.45 or 0.6 weight percent, or higher, and this used in the oxidation process of this invention.

The amount of sulfide and/or hydrosulfide in the alkaline solution which is oxidized (initial solution) in the presence of the effective catalytic amount of the insoluble smelt solids may vary over wide ranges. Typically, however, and especially when using green liquor solutions, which are to be oxidized by this selective catalytic process to sodium thiosulfate, the initial concentration of sodium sulfide (and/or hydrosulfide) in the alkaline aqueous solution will generally range between about 8 to about 70 or 80 grams per liter expressed as $Na_2O$, or even higher amounts. Most typically, however, the initial concentration will be between about 10 and about 30 grams per liter expressed as $Na_2O$. In particular, it should be noted, however, that the catalytic effect is especially highly pronounced at concentrations of less than about 4 or 5 grams per liter of the sulfide (and/or hydrosulfide) expressed as the oxide and the catalytic effect is even more remarkably pronounced when the concentration is less than about 1 gram per liter of sodium sulfide expressed as $Na_2O$. Because of this pronounced catalytic action at concentrations of less than 4-5 grams per liter, and especially at concentrations less than 1 gram per liter (expressed as the oxide), the oxidation may be effected to a residual sulfide concentration of as little as 0 to about 0.2 or 0.4 gram per liter as $Na_2O$ in quite short times. Without the use of the insoluble smelt solids, these concentrations could not be attained in a reasonable economic period of time.

In the more preferred practice of this invention, the oxidation is effected at low temperatures, that is, at temperatures generally less than about 300° F. and, more desirably, less than about 280° F. Thus, for example, desirable temperatures at which oxidation is effected, will range between about 140° F. to about 280° F. with an especially suitable range being between about 200° F. to about 280° F. Exemplary operating pressures may be pressures less than about 125 p.s.i.a. Particularly convenient operating pressures are lower pressures generally ranging between about 14.7 p.s.i.a. to about 60 p.s.i.a.

In general, the catalytic oxidation reaction is allowed to proceed for a period of time sufficient to substantially consume all of the sodium sulfide. Again, the sulfide is used to define sulfide per se, hydrosulfide per se and mixtures thereof. It is undesirable to continue the reaction beyond this point because of an additional reaction taking place which results in the depletion of thiosulfate and caustic and resultant sulfate formation. A particularly convenient mode of operation is to monitor the amount of sodium sulfide present and to allow the reaction to proceed until there is approximately less than about 1 gram per liter of sodium sulfide expressed as $Na_2O$, for example, 0.2 to 1 gram per liter. As indicated above, however, relative to oxidation without insoluble smelt solids, extremely high reaction rates with insoluble smelt solids are attained at lower concentrations and it therefore may be desirable in certain instances to allow the reaction to proceed to a residual sulfide concentration of approximately 0.1 gram per liter reported as $Na_2O$.

In order to aid those skilled in the art to make and use the present invention, there follows a description of some of the experimental procedure employed in accordance with this invention. It will, of course, be apparent that this description is merely exemplary and is in no way intended as a limitation upon the present invention. Unless otherwise indicated, oxygen per se was used as the oxidizing gas.

The equipment, or the chemical reactor, in which oxidation was done, so as to convert a major proportion of the sulfide in the alkaline solution to a thiosulfate, was a conventional reactor which included no packings of any sort. That is, the reactor was not filled with any sort of surface giving balls. Steel balls, for example, were not present. The specific reactor was generally cylindrically shaped and was of a nominal 1 gallon capacity. This reactor was constructed of Type 316 stainless steel and one such suitable reactor may be purchased from The Bench Scale Equipment Company. The reactor vessel had a nominal inside diameter of approximately 6.25 inches and was approximately 9.75 inches deep; it was rated for 575 p.s.i.g. operation under the ASME Code. A variable speed agitator drive was employed and the specific agitators used were of the gas-dispersing type, that is, for the most part a vaned-disk agitator, 2.5 inches in diameter, with 8 vanes, was used. Turbine agitators were also used and were found to be equally effective in this invention. The oxygen-containing gas, by which the oxidation is effected, may, for example, be air or oxygen and the equipment was generally so arranged and constructed that this gas entered the reactor at the bottom directly below the gas-dispersing type agitator. The reactor was also provided with conventional heating and cooling means for purposes of allowing the reaction temperature to be maintained at a level of about plus or minus 1-2 degrees F. The specific heating equipment employed was a conventional electrical band heater and the cooling equipment was a simple cooling coil using water as the cooling medium. In order to allow the reactions to take place at superatmospheric pressure, conventional pressure regulating valves and devices were employed. Air or oxygen from pressurized cylinders was the source of the oxygen-containing gas and conventional pressure regulator and control type devices were employed to conduct these gases into the reactor. In general, the oxygen-containing gas was fed at the rate of about one-half to about two standard cubic feet per minute into the bottom of the reactor. Superficial velocities of the oxygen-containing gas through the reactor generally ranged between approximately 110 to about 540 feet per hour.

In general, the reactions were done under what might be considered two types of operations, one being what may be termed a semi-batch operation, and the other a continuous operation.

In the semi-batch operation, the solution which is to be oxidized may be charged into the reactor and then the appropriate amount of the insoluble smelt solids added thereto or, if desired, the insoluble smelt solids may be added to the solution prior to discharge into the reactor and the solution, including the insoluble smelt solids then pumped into the reactor. The oxygen-containing gas, for example, air or oxygen, after the solution has been heated to the reaction temperature, is then injected into the solution through the bottom of the reactor adjacently beneath the gas-dispersing agitator and allowed to bubble through the solution. In this arrangement a conduit was connected to the reactor and communicated with the head-space of the reactor, whereby the excess oxygen-containing gas and/or inert components thereof, continuously pass out of the reactor. Of course, this conduit, externally of the reactor, will include suitable pressure regulating means in order to maintain the reactor at the operating pressure. The unreacted gas leaving the reactor flowed to a separator vessel which removed entrained liquid and also condensed most of the water vapor present. The separated liquid and condensate were returned to the reactor.

In the continuous flow oxidation, the solution to be oxidized was pumped to the reactor by a small reciprocating plunger pump, it, of course, being apparent that the insoluble smelt solids which function as the catalyst are generally added prior to this time. The effluent solution, along with unreacted gas, overflowed the reactor by means of an overflow conduit which regulated the volume of liquid in the reactor. In general, the retention time in the reactor when operating in the continuous mode, was varied by adjusting the pumping rate. Again, the overflow conduit includes suitable pressure regulating means to allow the reactor to be maintained at superatmospheric pressure. Typically, the average retention time of the reactor when operating in the continuous mode varied between approximately 30 and 70 minutes. In the continuous mode of operation, the air and oxygen rates through the reactor were as set forth above with respect to the semi-batch type operation. Additionally, the solution containing the catalyst of this invention was typically pumped into the reactor at a rate between about 40 to about 90 ml. per minute.

Most of the experiments were made with solutions formed by adding smelt (including the water-insoluble solids) to water. The smelt was obtained as the product of the recovery funace from a commercially operating pulping mill (neutral sulfite semi-chemical mill using hardwood) identified as Pulping Mill No. 1. The composition of this smelt is set forth in Table B. The insoluble solid portion varied between about 1.3-1.7 weight percent and on the average amounted to approximately 1.5 percent of the smelt. This water-insoluble portion is a complex mixture containing calcium carbonate, magnesium carbonate, silica, alumina, iron, manganese, and traces of other metallic elements, Many of the metallic elements are believed to be present in the form of sulfides. An exemplary analysis of the insoluble solids is set forth below in Table A:

TABLE A.—INSOLUBLE SMELT SOLIDS

I (wet analysis)

| Constituent on oxide basis: | Wt. percent |
|---|---|
| $SiO_2$ | 2.0 |
| $Al_2O_3$ | 0.8 |
| $Fe_2O_3$ | 3.1 |
| MnO | 0.7 |
| CaO | 37.9 |
| MgO | 9.7 |
| BaO | 0.7 |
| Total S as S | 2.3 |
| $Na_2O$ | 2.1 |
| $K_2O$ | 0.14 |
| $Li_2O$ | (¹) |

¹ Not detected.
Ignition loss of 17.1% at 700° C. for 1 hour.

II (emission spectrograph)

| Element: | Wt. percent |
|---|---|
| Al | .1-1 |
| Ba | .2-2 |
| Ca | >10 |
| Cr | .02-.2 |
| Cu | .05-.5 |
| Fe | .3-3 |
| Mg | >1 |
| Mn | .3-3 |
| Pb | .02-.2 |
| Si | >1 |
| Sr | .09-.9 |
| Ti | .009-.09 |
| Zn | .09-.9 |
| Zr | .05-.5 |

Inasmuch as the alkali metals shown in the wet analysis are apparently water-soluble materials, a corrected approximate analysis (Na and K free) for the insoluble portion of the smelt is set forth hereinafter with the constituents reported as the compound form in which they are most likely present (weight percent): $SiO_2$, 2.1%; $Al_2O_3$, 0.8%; FeS, 3.5%; MnS, 0.9%; $CaCO_3$, 70.5%; $MgCO_3$, 21.0%; $BaCO_3$, 0.9%; balance are traces of the other elements set forth in the emission spectrographic data reported above with these elements apparently being present as sulfides or carbonates.

TABLE B

Comoposition of smelt from Pulping Mill No. 1

| | Percent by wt. |
|---|---|
| $Na_2S$ | 22.8 |
| $Na_2CO_3$ | 67.0 |
| $Na_2S_2O_3$ | 1.9 |
| $Na_2SO_3$ | 2.1 |
| $Na_2SO_4$ | 4.7 |
| Insoluble smelt solids | 1.5 |

The results of two semi-batch oxidation experiments at 320° F. and 107 p.s.i.a. are set forth in FIG. 1. In figures of this kind, in which the concentration of sodium sulfide, including that present in the form of hydrosulfide, is plotted against oxidation time, the rate of oxidation is indicated by the slope of each curve. These experiments were made with aqueous solutions of smelt of the type indicated above, with added sodium sulfide to give a higher sulfide concentration. Two high sulfidity solutions were generally prepared as follows. With agitation 425 grams of smelt, as set forth in Table B, were added to about 3,000 ml. of water and then 636 grams of $Na_2S \cdot 9H_2O$ added. The composition of these high sulfidity solutions in grams per liter as $Na_2O$ was generally as follows:

|  | Grams per liter as $Na_2O$ |
|---|---|
| $Na_2S$ | 66.6 |
| $Na_2CO_3$ | 54.4 |
| $Na_2S_2O_3$ | 2.2 |
| $Na_2SO_3$ | 2.2 |
| $Na_2SO_4$ | 3.4 |

One of these batches was then clarified and filtered to remove the insoluble smelt solids and the other was employed as is, wherein the concentration of the insoluble smelt solids was about 0.16 weight percent. In FIG. 1 the curve identified by squares shows the rate of sulfide oxidation in the experiment wherein the insoluble smelt solids were entirely removed from the solution by filtration, thus simulating a clarified green liquor free of suspended insoluble smelt solids. The curve marked by circles shows the oxidation rate in a similar experiment with the insoluble smelt solids left in the solution during the oxidation. In these experiments, the respective solutions as set forth above were charged to the reactor and the reactor heated to about 320° F. and oxygen was then metered to the reactor at a rate of 0.5 s.c.f.m. (standard cubic feet per minute) while agitation was being effected by a conventional, standard type, vaned-disk agitator rotating at about 1,000 r.p.m. A comparison of the slopes of the curves shows that the reaction rate may be increased in excess of 100% using the insoluble smelt solids.

Figure 2:
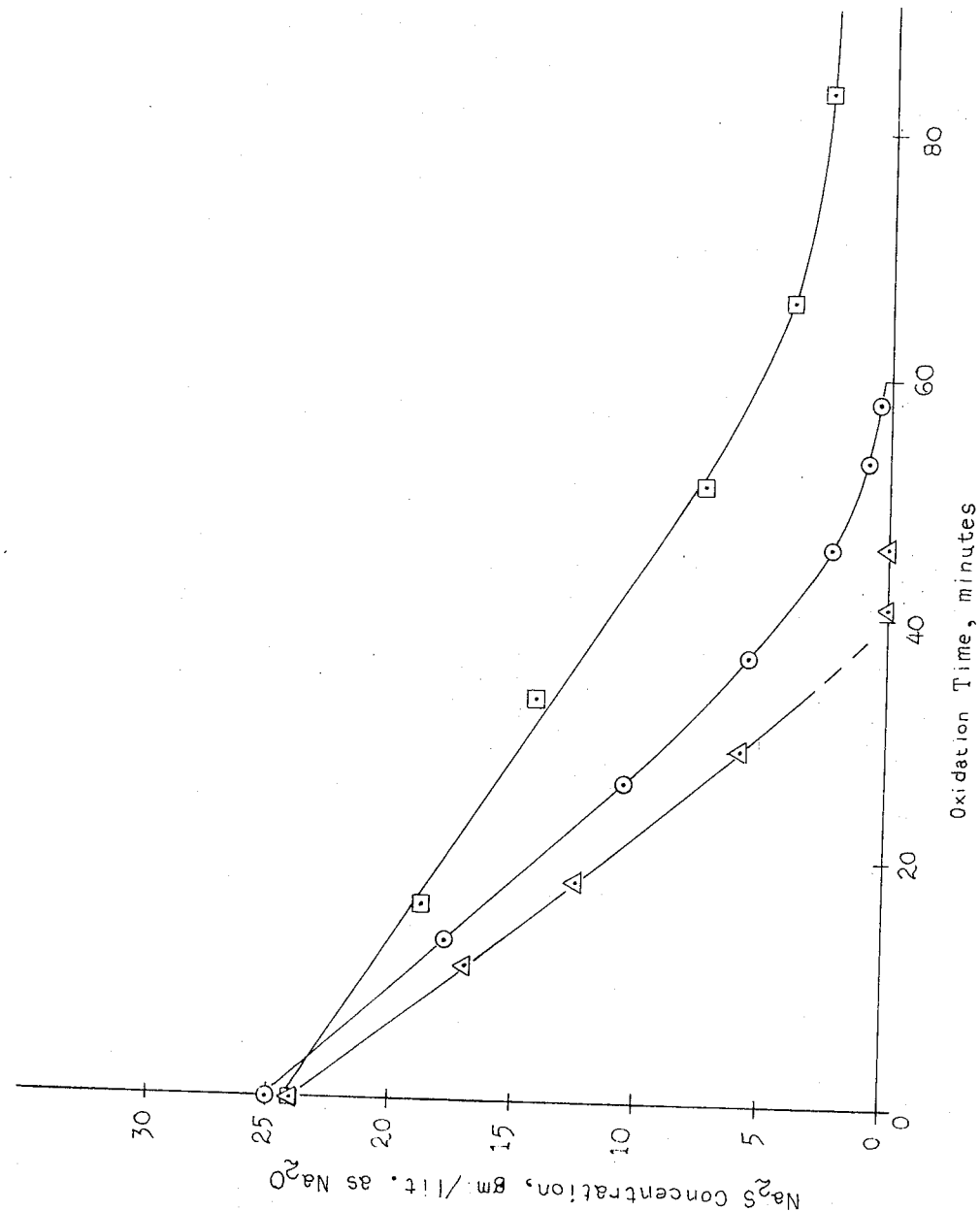

The presence of insoluble smelt solids also resulted in increased oxidation rates at 160° F. and 52 p.s.i.a. pressure, with an air flow of 2.0 s.c.f.m and agitation by means of a gas-dispersing, vaned-disk agitator, to keep insolubles dispersed, and also disperse the air at 1,000 r.p.m. These experiments were made with solutions prepared as follows, using the smelt set forth in Table B as supplied from Pulping Mill No. 1. Three batches or solutions were generally prepared as follows: about 514 grams of smelt as set forth in Table B were added to approximately 3500 ml. of water and stirred to provide a solution which would include the insoluble smelt solids uniformly dispersed therein. One of these batches was employed as is, using a charge of 3,200 ml. of the prepared mixture. In another run, the mixture as prepared above, was allowed to settle and then filtered to remove the insoluble smelt solids. Approximately 3,200 ml. of the filtrate was then used in the experiment. To the third mixture as prepared above, additional insoluble smelt solids were added to provide a concentration of approximately 2.9 weight percent of the insoluble smelt solids in the batch. Approximately 3,200 ml. of this higher concentration, i.e., 2.9 percent by weight insoluble smelt solids, was then used in a third experiment. The results for these runs are depicted in FIG. 2. In FIG. 2, the curve identified by squares represents the sulfide oxidation rate with no insoluble smelt solids present. The curve marked by circles shows the oxidation rate in the presence of about 0.2 weight percent of insoluble solids. The curve marked by triangles represents the oxidation rate with the added insoluble smelt solids, that is, with about 2.9 weight percent insoluble smelt solids suspended in the solution. FIG. 2 clearly demonstrates the advantage of increased oxidation rate obtained from the presence of insoluble smelt solids. By comparison of the slopes of the curves, which indicate the oxidation rates, it can be seen that the insoluble smelt solids are especially effective at low sulfide (e.g., less than about 5 grams per liter as $Na_2O$) concentrations.

Figure 3:
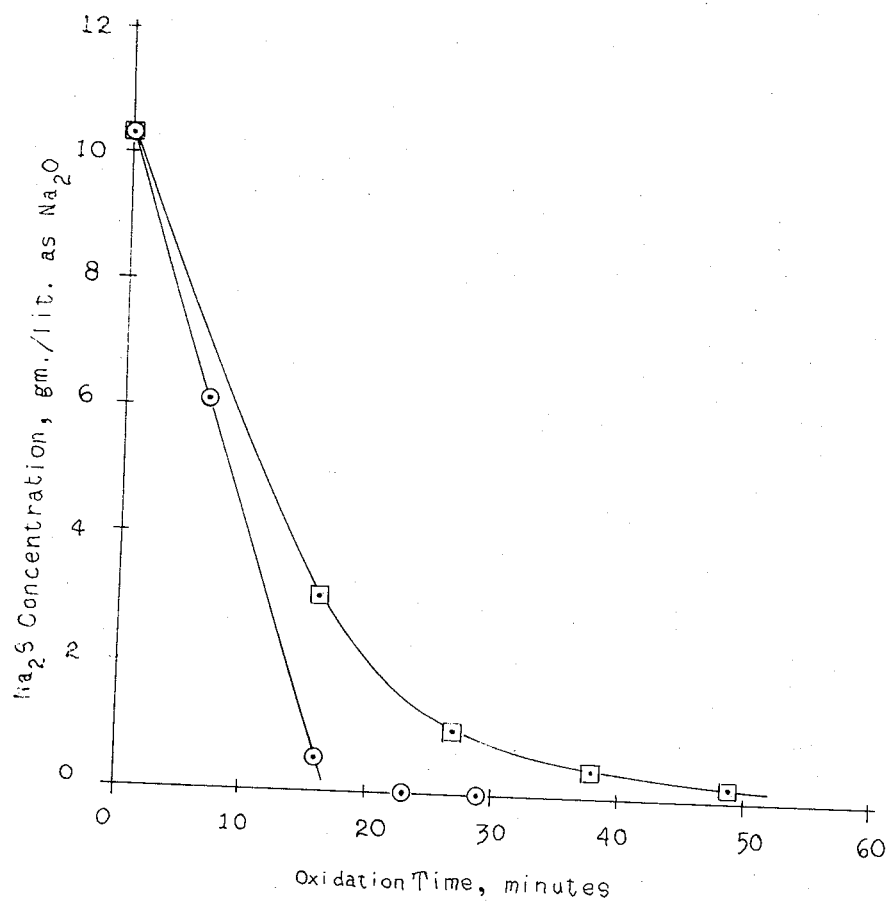

In order to test the catalytic activity of insoluble smelt solids from another commercially operating pulping mill, experiments were made with clarified and unclarified green liquor (pH between 12–13) provided by this mill. These oxidations were carried out at 160° F. and 52 p.s.i.a., with an air rate of 2.0 s.c.f.m and the vaned-disk agitator at 1000 r.p.m. The results of the direct oxidation studies are shown in FIG. 3. In FIG. 3, the curve marked by squares shows the sulfide oxidation rate with the insoluble smelt solids removed from the green liquor by settling and filtration. The curve identified by circles shows the rate with the insoluble smelt solids left in the green liquor. At a sodium sulfide concentration of 0.4 gram per liter, expressed as $Na_2O$, the oxidation rate with insoluble smelt solids present is about 16 times the rate without such solids, which results strongly demonstrate the unobvious strong catalytic effects now made available to the art by the present invention.

In passing, it should be mentioned that in semi-batch operation, the solutions which are to be oxidized to thiosulfate are charged to the reactor and heated to the operating temperature and pressure before the oxygen-containing gas is added to the reactor. Samples are conveniently removed to check the oxidation of sulfide to thiosulfate with time.

In a semi-batch type oxidation, an experiment was performed at 160° F. and 52 p.s.i.a., with cobalt nitrate added to a smelt solution containing about 0.2 weight percent insoluble smelt solids. The smelt solution itself was prepared by adding about 514 grams of smelt (Table B) to about 3500 ml. of water. To about 3200 ml. of this, there was then added the cobalt nitrate. The addition of cobalt nitrate in a concentration of about 11 p.p.m. (parts per million) cobalt (34 p.p.m. cobalt nitrate) resulted in a substantial increase in the oxidation rate at low sulfide concentrations, e.g., below 3.0 grams per liter, expressed as $Na_2O$. That is, at higher concentrations, the rate was not significantly increased but at this low concentration, the rate was about three times the rate with only about 0.2% insoluble solids. This run used a vaned-disk agitator running at about 990 r.p.m. and an oxygen rate of feed of about 2 s.c.f.m.

Figure 4:
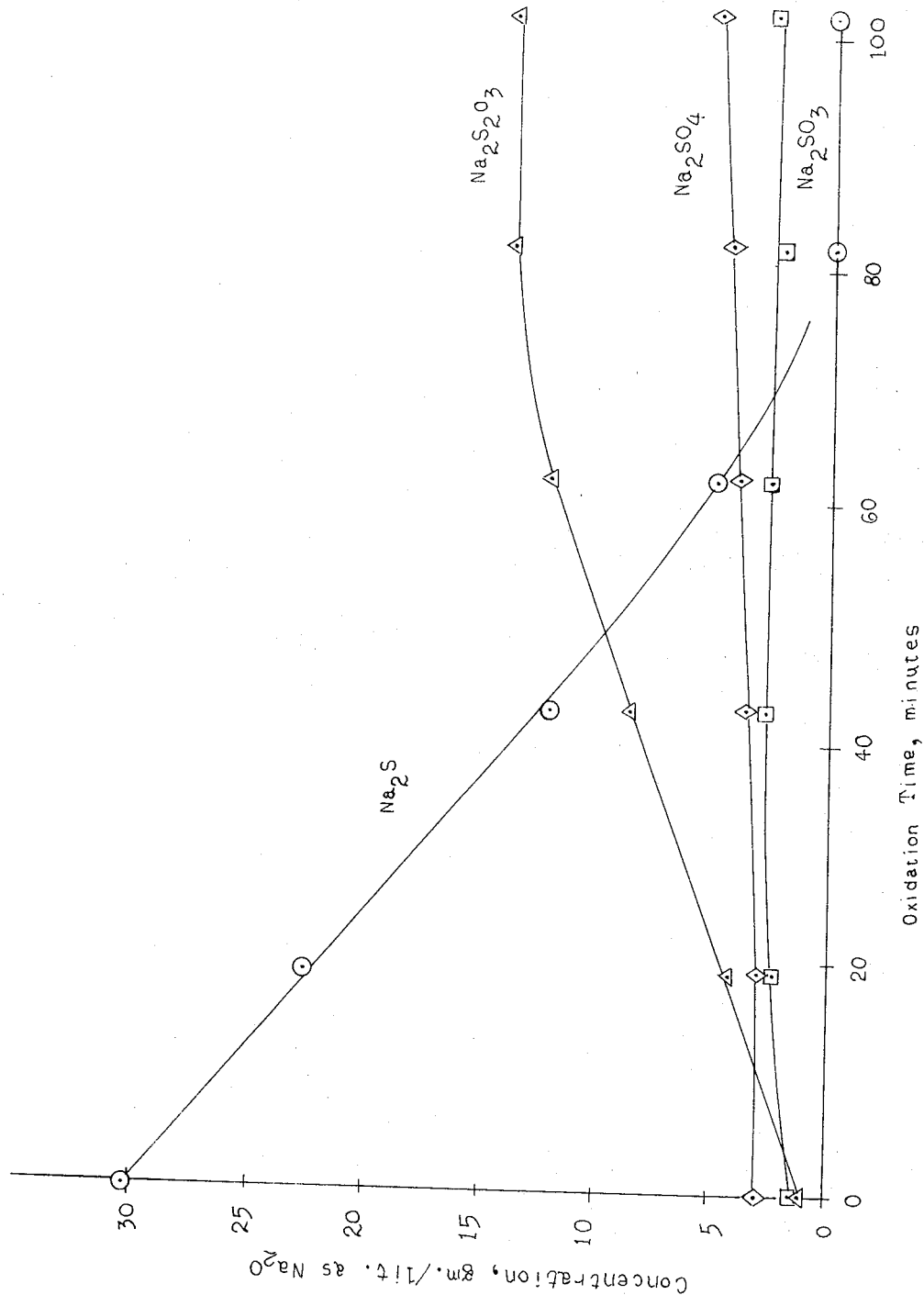

In FIG. 4 the results for another oxidation study performed according to the spirit of the invention are graphically illustrated by showing the sodium sulfide and product concentrations in a semi-batch oxidation of smelt solution at 200° F. and 35 p.s.i.a., with insoluble smelt solids present. The agitator was a vaned-disk rotating at about 1000 r.p.m. and the air feed rate was about 1 s.c.f.m. with the oxygen having a partial pressure of about 5 p.s.i.a. The reaction was done in the presence of about 0.2% insoluble smelt solids prepared by using 3200 ml. of a mixture obtained by adding 514 grams of smelt (Table B) to 3500 ml. of water. The sodium sulfide was completely oxidized in 82 minutes. Product yields under these conditions were about 90% oxidation of the sulfide to sodium thiosulfate, 5% to sodium sulfite, and 5% to sodium sulfate.

The following continuous flow experiment was performed. The reactor was fed at a rate of about 60.6 cc. per minute with an alkaline sodium sulfide solution containing insoluble smelt solids and the reactor had a hold-up of about 2790 ml.; the agitator (vaned-disk) was operated at about 1000 r.p.m. and air at a rate of 2.0 s.c.f.m. (229 ft. per hr. superficial velocity) was employed. In this experiment, wherein the reaction temperature was 240° F. and the pressure 71 p.s.i.a. (56.3 p.s.i.g.), with insoluble smelt solids suspended in the feed, about 99.4% of the total sulfide in the feed solution was oxidized, with about 98.5% being converted to sodium thiosulfate, about 1% to sodium sulfate, and virtually none to sodium sulfite. The feed mixture for the continuous flow operation described immediately above contained the following constituents in grams per liter reported as sodium oxide:

| | |
|---|---:|
| $Na_2CO_3$ | 57.7 |
| $Na_2S$ | 26.7 |
| $Na_2S_2O_3$ | 1.1 |
| $Na_2SO_3$ | 1.0 |
| $Na_2SO_4$ | 2.5 | with an insoluble smelt solids content of approximately 0.2 weight percent.

The selective catalytic effects of insoluble smelt solids on the product yields as well as on the oxidation rates were demonstrated by the following experiment.

A semi-batch oxidation experiment was performed at 320° F. and 107 p.s.i.a. with solutions of smelt and additional sodium sulfide, with and without insoluble smelt solids present. The solutions were generally prepared as follows. In one case 425 grams of smelt as set forth in Table B were added to 3000 ml. of water, and then 636 grams of sodium sulfide with 9 molecules of water of hydration were added thereto. This solution was used as is, that is, it contained about 0.16 weight percent of insoluble smelt solids. Another solution was prepared in the same manner but the solids were allowed to settle and then were removed by filtration to produce a solution containing no insoluble smelt solids. A charge of approximately 3200 ml. of these respectively prepared charges was then employed in two different experiments. In these experiments the agitator (vaned-disk type) was operated at an agitator speed of about 1000 r.p.m. and oxygen was charged to the reactor at the rate of 0.5 s.c.f.m. Without insoluble smelt solids present, complete oxidation of sulfide required about 30 minutes, and the conversion of sulfide was about 55% to thiosulfate, 17% to sulfite, and 28% to sulfate. With insoluble smelt solids present, complete oxidation of sodium sulfide took place in 13 minutes, and the conversion was 72% to thiosulfate, 8% to sulfite, and 20% to sulfate. The above effect on the reaction products and sulfide conversion is further evidence that insoluble smelt solids have a true selective catalytic effect.

Another experiment was performed in which calcium carbonate powder was added to the filtrate of a settled and filtered solution of smelt (425 grams), and sodium sulfide (636 grams of $Na_2S \cdot 9H_2O$), with 3000 ml. of $H_2O$, giving about 1.4% calcium carbonate by weight. The oxidation was carried out at 320° F. and 107 p.s.i.a., with 0.5 s.c.f.m. of oxygen flow and agitation by a vaned-disk agitator at 1000 r.p.m. The calcium carbonate had no effect on the oxidation rate and therefore is not a catalyst. The surface providing feature of the calcium carbonate is not effective in solution oxidation to increase the reaction rate.

The novel process of this invention enjoys both a wide industrial and practical application. For example, the employment of the insoluble smelt solids and the inorganic salts can be used to recover valuable sulfur products from pulping green liquors. Also, the oxidative process of the invention with its addition of insoluble smelt solids can be used to manufacture sodium thiosulfate from alkaline sodium sulfide or sodium hydrosulfide solutions, which latter product has utility in the photographic industry. In addition to the above set-forth utility, the invention can also be used for oxidizing other sulfides and hydrosulfides, to obtain valuable sulfur compounds therefrom. The process of the invention can also be used for recovering hydrogen sulfide and sulfur dioxide from flue gases to thereby prevent their unwanted emission into the atmosphere.

As hereinbefore indicated, the present invention provides for the selective catalytic action of insoluble smelt solids to convert a major proportion of sodium sulfide to sodium thiosulfate. The formation of this thiosulfate also produces substantial amounts of sodium hydroxide as indicated in the previous equations set forth in the present application. Because sodium sulfide is effectively removed with the formation of sodium hydroxide, the products of the oxidation reaction employing the insoluble smelt solids and, more specifically, the solution of these products, are well adapted to be employed as a scrubbing liquid to recover sulfur dioxide emanating from furnace flue gases, such as recovery boiler flue gases or the power boiler flue gases employed in the pulping arts, as, for example, in a neutral sodium base sulfite mill. Thus, in short, because of the substantial amounts of sodium hydroxide which are formed in conjunction with the amounts of sodium thiosulfate formed by employing insoluble smelt solids as a selective catalyst for the oxidation of sodium sulfide or hydrosulfide to thiosulfate, this caustic may be effectively employed for purposes of absorbing $SO_2$. For further details with regard to the absorption of $SO_2$ from flue gases, by use of a scrubbing liquid which is oxidized green liquor, reference may be had to copending patent application, Ser. No. 847,966, now U.S. Pat. 3,647,363. In a simple mode of operation, green liquor which has been oxidized in accordance with this invention, may be used as a scrubbing liquid by simply passing the sulfur dioxide bearing flue gases therethrough.

Additionally, because of the high rates of sulfide conversions realized by employing the effective catalytic amounts of the selective insoluble smelt solid catalysts of this invention, the reaction products of the oxidation of the sodium sulfide to sodium thiosulfate may be employed in a quite effective manner for the selective absorption of hydrogen sulfide from stack gases. Thus, for example, because of the high oxidation rates attained and especially the high rates at low sulfide concentration, the sodium sulfide solutions may be easily and conveniently oxidized as set forth in the present invention to sulfide concentrations of 0.001 to 0.1 gram per liter of $Na_2S$ reported as $Na_2O$ and then the reaction product solution employed for the selective absorption of hydrogen sulfide in the manner set forth in the Pulp and Paper Magazine of Canada, Dec. 5, 1969, at pages 69–74 thereof.

Because various modifications may be made in the present invention without departing from the spirit of the invention, it is intended that the information contained in the foregoing specification be interpreted merely as illustrative and not in a limited manner.

What is claimed is:

1. A catalyst solution oxidation process which comprises the steps of: providing an unpacked reactor having a gas-dispersing agitator therein; introducing an alkaline water-solution of an oxidizable, inorganic sulfide or hydrosulfide into said reactor; and intimately contacting said aqueous solution, in the presence of at least about 0.1 weight percent of water insoluble smelt solids, while being agitated in said reactor with said agitator with an oxygen-containing gas for a period of time sufficient to catalytically oxidize at least about 70 percent of said sulfide or hydrosulfide to thiosulfate and form a solution of said latter compound.

2. The process of claim 1 wherein said oxygen-containing gas intimately contacts said solution while said solution is at a temperature between about 140° F. to about 360° F. and wherein said smelt solids are present in an amount of at least about 0.15 percent.

3. The method of claim 2 wherein said temperature is between about 140° F. to about 280° F. and wherein said smelt solids are present in an amount of at least about 0.2%.

4. The method of claim 3 wherein said temperature is between about 200° F. and about 280° F.

5. The method of claim 3 wherein said solution is a solution of sodium sulfide or sodium hydrosulfide and wherein said step of intimately contacting said solution with an oxygen-containing gas is conducted for a sufficient time to produce a residual sulfide or hydrosulfide concentration in said solution of between about 5 grams per liter to about 0.001 gram per liter of the sulfide or hydrosulfide expressed as $Na_2O$.

6. A catalytic process for the direct oxidation of an alkaline, aqueous solution of sodium sulfide or sodium hydrosulfide which comprises: adding an effective catalytic amount of a catalyst to said solution wherein said catalyst consists essentially of the water insoluble fraction of smelt solids and a water-soluble salt of cobalt, nickel or iron; and intimately contacting said alkaline, aqueous solution in the presence of said catalyst with an oxygen-containing gas for a sufficient period of time to catalytically oxidize a major proportion of said sulfide or hydrosulfide to thiosulfate.

7. The method of claim 6 wherein said catalyst consists essentially of said insoluble smelt solids and cobalt nitrate and wherein said oxygen-containing gas intimately contacts said solution for a sufficient period of time to provide a residual sulfide or hydrosulfide concentration in said solution of below 3 grams per liter expressed as $Na_2O$.

8. A process for converting a major proportion of a sulfide or hydrosulfide or mixture thereof to a thiosulfate which comprises: adding an effective catalytic amount of the water insoluble fraction of smelt solids obtained from a sulfite or kraft pulping process to an alkaline, aqueous solution containing an oxidizable sulfide, hydrosulfide or mixture thereof, and intimately contacting said solution in the presence of said catalyst with an oxygen-containing gas for a sufficient period of time to catalytically convert a major proportion of said sulfide or hydrosulfide or mixtures thereof to thiosulfate.

9. The method of claim 8 wherein said intimate contacting is done for a sufficient period of time to convert at least about 70 percent of said sulfide, hydrosulfide or mixture thereof to thiosulfate and wherein said oxidizable sulfide, hydrosulfide or mixture thereof is sodium sulfide, hydrosulfide or mixture thereof.

10. The method of claim 9 wherein said intimate contacting is done for a period of time to convert at least 90 percent of said sulfide, hydrosulfide or mixture thereof to thiosulfate.

11. The method of claim 8 wherein said intimate contacting is done for a time period to produce a residual total sulfide concentration of between about zero and about 5 grams per liter expressed as the oxide.

12. The method of claim 11 wherein said residual concentration is between about .001 to about 2 grams per liter.

13. The method of claim 8 wherein the amount of insoluble smelt solids is in excess of about 0.1 weight percent.

14. The method of claim 13 wherein the insoluble smelt solids are present in an amount in excess of about .15 weight percent.

15. The method of claim 8 wherein said step of intimately contacting said solution with an oxygen-containing gas comprises injecting an oxygen-containing gas into said solution while said solution is at a temperature between about 140° F. and about 280° F. and in the presence of an agitating gas-dispersing agitator and continuing said oxygen-containing gas injection to convert at least about 90% of said sulfide, hydrosulfide or mixture thereof to thiosulfate.

16. In a process wherein a green liquor solution is contacted with oxygen to oxidize sodium sulfide therein, the improvement comprising adding to said solution prior to oxidation contact, the water insoluble fraction of smelt solids obtained from kraft or sulfite pulping in an amount sufficient to catalytically increase the rate of the oxidation reaction.

17. The process of claim 16 wherein sufficient solids are added so as to be present in an amount of at least about 0.15 weight percent.

References Cited

UNITED STATES PATENTS

| | | | |
|---|---|---|---|
| 1,659,193 | 2/1928 | Drewsen. | |
| 3,647,363 | 3/1972 | Chari et al. | |
| 1,997,773 | 4/1935 | Haglund. | |
| 2,717,825 | 9/1955 | Greenawalt. | |
| 2,640,758 | 6/1953 | Aries et al. | |
| 2,772,240 | 11/1956 | Trobeck et al. | |
| 2,642,336 | 6/1953 | Greenawalt. | |
| 3,165,378 | 1/1965 | Greenawalt. | |
| 1,488,829 | 4/1924 | Plumstead | 23—115 |
| 2,665,249 | 1/1954 | Zimmermann | 210—63 X |
| 2,758,017 | 8/1956 | Allen et al. | 23—115 X |
| 1,841,419 | 1/1932 | Sperr | 23—115 X |
| 1,841,420 | 1/1932 | Sperr | 23—115 X |
| 3,029,202 | 4/1962 | Brown | 210—63 |
| 3,471,254 | 10/1969 | Urban | 23—114 |

FOREIGN PATENTS

| | | | |
|---|---|---|---|
| 706,929 | 3/1965 | Canada | 23—115 |
| 174,653 | 2/1922 | Great Britain | 23—115 |

OTHER REFERENCES

Boyer, "Southern Pulp & Paper Manufacturer," Oct. 10, 1957, pp. 28–34.

HERBERT T. CARTER, Primary Examiner

U.S. Cl. X.R.

423—225, 242, 179, 514, 641, 517

UNITED STATES PATENT OFFICE
CERTIFICATE OF CORRECTION

Patent No. 3,752,875          Dated August 14, 1973

Inventor(s)  H. A. O'Hern, Jr., et al

It is certified that error appears in the above-identified patent and that said Letters Patent are hereby corrected as shown below:

Column 3, line 32 "desirable" should be -- desirably --.

Column 3, line 62 "catalystic" should be -- catalytic --.

Claim 1, line 1 "catalyst" should be -- catalytic --.

Signed and sealed this 17th day of December 1974.

(SEAL)
Attest:

McCOY M. GIBSON JR.          C. MARSHALL DANN
Attesting Officer            Commissioner of Patents